(12) United States Patent
Miyajima

(10) Patent No.: US 12,095,395 B2
(45) Date of Patent: Sep. 17, 2024

(54) POWER CONVERSION APPARATUS

(71) Applicant: DAIKIN INDUSTRIES, LTD., Osaka (JP)

(72) Inventor: Takayuki Miyajima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/754,772

(22) PCT Filed: Oct. 21, 2020

(86) PCT No.: PCT/JP2020/039624
§ 371 (c)(1),
(2) Date: Apr. 12, 2022

(87) PCT Pub. No.: WO2021/079919
PCT Pub. Date: Apr. 29, 2021

(65) Prior Publication Data
US 2024/0171109 A1 May 23, 2024

(30) Foreign Application Priority Data

Oct. 23, 2019 (JP) .................................. 2019-192870

(51) Int. Cl.
H02P 29/50 (2016.01)
H02M 1/12 (2006.01)
(Continued)

(52) U.S. Cl.
CPC ............ *H02P 27/08* (2013.01); *H02M 1/126* (2013.01); *H02M 7/5395* (2013.01); *H02P 21/05* (2013.01); *H02P 21/22* (2016.02)

(58) Field of Classification Search
CPC .......... H02P 27/08; H02P 21/22; H02P 21/05; H02P 29/50; H02P 27/06; H02M 1/126; H02M 7/5395
See application file for complete search history.

(56) References Cited

U.S. PATENT DOCUMENTS

2009/0167224 A1    7/2009  Miura et al.
2013/0300334 A1*  11/2013  Tooyama ............... H02P 29/50
                                                        318/504
(Continued)

FOREIGN PATENT DOCUMENTS

EP    3522353      8/2019
JP    H04-054872   2/1992
(Continued)

OTHER PUBLICATIONS

International Search Report for PCT/JP2020/039624 mailed on Dec. 28, 2020.
(Continued)

*Primary Examiner* — Cortez M Cook
(74) *Attorney, Agent, or Firm* — IPUSA, PLLC

(57) ABSTRACT

A power conversion apparatus that converts an input alternating current power supplied from an alternating current power supply into an output alternating current power having a predetermined voltage and frequency, includes an inverter circuit configured to supply the output alternating current power to a motor, and a compensation unit configured to compensate for a harmonic of an input power of the motor, and the compensation unit detects a harmonic component generated in synchronism with a speed of the motor in the input power, and varies a phase of an alternating current voltage output from the inverter circuit at the same frequency as the harmonic component, so as to reduce the harmonic component.

13 Claims, 12 Drawing Sheets

(51) Int. Cl.
*H02M 7/5395* (2006.01)
*H02P 21/05* (2006.01)
*H02P 21/22* (2016.01)
*H02P 27/08* (2006.01)

(56) References Cited

U.S. PATENT DOCUMENTS

2016/0204729 A1* 7/2016 Yamakawa ............. H02P 27/06
                                                                                                        318/504
2019/0229645 A1* 7/2019 Iyasu ................... H02M 7/5387
2020/0007049 A1* 1/2020 Kitano .................... H02P 21/00

FOREIGN PATENT DOCUMENTS

| JP | H05-176584 | 7/1993 |
| JP | 2010-098941 | 4/2010 |
| JP | 2012-016276 | 1/2012 |
| JP | 2012-165634 | 8/2012 |

OTHER PUBLICATIONS

International Preliminary Report on Patentability for PCT/JP2020/039624 mailed on May 5, 2022.
Extended European search report for EP20878173.2 dated Oct. 17, 2023.

* cited by examiner

POWER CONVERSION APPARATUS

TECHNICAL FIELD

The present disclosure relates to power conversion apparatuses.

BACKGROUND ART

Harmonic components, such as a component that is 5 times and a component that is 7 times the motor speed (electric angular velocity), may be included in an induced voltage of the motor (for example, refer to Patent Document 1).

PRIOR ART DOCUMENTS

Patent Documents

Patent Document 1: Japanese Laid-Open Patent Publication No. 2012-165634

DISCLOSURE OF THE INVENTION

Problem to be Solved by the Invention

However, when the harmonic component is included in the induced voltage of the motor, a harmonic component is also generated in an input power of the motor, and a harmonic of the same order as the harmonic component generated in the input power of the motor may be generated at an input side of an inverter circuit that supplies power to the motor.

The present disclosure proposes a power conversion apparatus capable of reducing the harmonic generated at the input side of the inverter circuit.

Means of Solving the Problem

A power conversion apparatus of the present disclosure is a power conversion apparatus that converts an input alternating current power supplied from an alternating current power supply into an output alternating current power having a predetermined voltage and frequency, including:
   an inverter circuit configured to supply the output alternating current power to a motor; and
   a compensation unit configured to compensate for a harmonic of an input power of the motor,
   wherein the compensation unit detects a harmonic component generated in synchronism with a speed of the motor in the input power, and varies a phase of an alternating current voltage output from the inverter circuit at the same frequency as the harmonic component, so as to reduce the harmonic component.

According to the power conversion apparatus of the present disclosure, it is possible to reduce the harmonic generated at the input side of the inverter circuit, because the phase of the alternating current voltage output from the inverter circuit is varied at the same frequency as the harmonic component generated in the input power of the motor, so as to reduce the harmonic component generated in the input power of the motor.

In the power conversion apparatus of the present disclosure, the compensation unit generates a compensation amount that varies at the same frequency as the harmonic component, and varies the phase of the alternating current voltage at the same frequency as the harmonic component based on the compensation amount.

According to the power conversion apparatus of the present disclosure, it is possible to reduce the harmonic generated at the input side of the inverter circuit, because the phase of the alternating current voltage is varied at the same frequency as the harmonic component based on the compensation amount.

In the power conversion apparatus of the present disclosure, the compensation unit adjusts a phase of the compensation amount according to the detected harmonic component, and varies an amplitude of the compensation amount according to one of the speed, a torque, and a power of the motor.

It is possible to reduce the harmonic generated at the input side of the inverter circuit, when the compensation unit adjusts the phase of the compensation amount according to the detected harmonic component, and varies the amplitude of the compensation amount according to one of the speed, the torque, and the power of the motor, as in the power conversion apparatus of the present disclosure.

In the power conversion apparatus of the present disclosure, the compensation unit adjusts an amplitude of the compensation amount according to the detected harmonic component, and varies a phase of the compensation amount according to one of the speed, a torque, and a power of the motor.

It is possible to reduce the harmonic generated at the input side of the inverter circuit, when the compensation unit adjusts the amplitude of the compensation amount according to the detected harmonic component, and varies the phase of the compensation amount according to one of the speed, the torque, and the power of the motor, as in the power conversion apparatus of the present disclosure.

In the power conversion apparatus of the present disclosure, the compensation unit adjusts a phase and an amplitude of the compensation amount according to the detected harmonic component.

It is possible to reduce the harmonic generated at the input side of the inverter circuit, when the compensation unit adjusts the phase and the amplitude of the compensation amount according to the detected harmonic component, as in the power conversion apparatus of the present disclosure.

The power conversion apparatus of the present disclosure includes:
   a converter circuit configured to rectify the input alternating current power, and supply power to the inverter circuit, wherein
   a capacitor is coupled between the converter circuit and the inverter circuit, in parallel to the converter circuit, and
   the compensation unit detects the harmonic component from a voltage across both ends of the capacitor.

It is possible to reduce the harmonic generated at the input side of the inverter circuit when the compensation unit detects the harmonic component from the voltages across both the ends of the capacitor, as in the power conversion apparatus of the present disclosure.

The power conversion apparatus of the present disclosure includes:
   a converter circuit configured to rectify the input alternating current power, and supply power to the inverter circuit, wherein
   a reactor is coupled between the converter circuit and the alternating current power supply or the inverter circuit, and
   the compensation unit detects the harmonic component from a voltage across both ends of the reactor.

It is possible to reduce the harmonic generated at the input side of the inverter circuit when the compensation unit detects the harmonic component from the voltages across both the ends of the reactor, as in the power conversion apparatus of the present disclosure.

The power conversion apparatus of the present disclosure, includes:
- a converter circuit configured to rectify the input alternating current power, and supply power to the inverter circuit, wherein
- a reactor is coupled between the converter circuit and the alternating current power supply or the inverter circuit, and
- the compensation unit detects the harmonic component from a current flowing through the reactor.

It is possible to reduce the harmonic generated at the input side of the inverter circuit when the compensation unit detects the harmonic component from the current flowing through the reactor, as in the power conversion apparatus of the present disclosure.

In the power conversion apparatus of the present disclosure, the compensation unit acquires a signal for detecting the harmonic component, during a period in which a voltage vector of the inverter circuit does not vary.

According to the power conversion apparatus of the present disclosure, because the compensation unit acquires a signal for detecting the harmonic component during a period in which the voltage vector of the inverter circuit does not vary, it is possible to improve a detection accuracy of the harmonic component compared to a case where the signal is acquired during the period in which the voltage vector varies.

MODE OF CARRYING OUT THE INVENTION

Hereinafter, embodiments will be described. First, the harmonics generated at an input side of an inverter circuit will be described.

Because a magnetomotive force and a gap permeance of a motor vary depending on a rotational position of the motor, a flux linkage varies in synchronism with a motor speed, and harmonic components, such as a component that is 5 times and a component that is 7 times the motor speed (electric angular velocity), may be included in an induced voltage of the motor. When such harmonic components are included in the induced voltage of the motor, a harmonic component, such as a component that is 6 times the motor drive frequency, may be generated in an input power of the motor.

Figure 1:
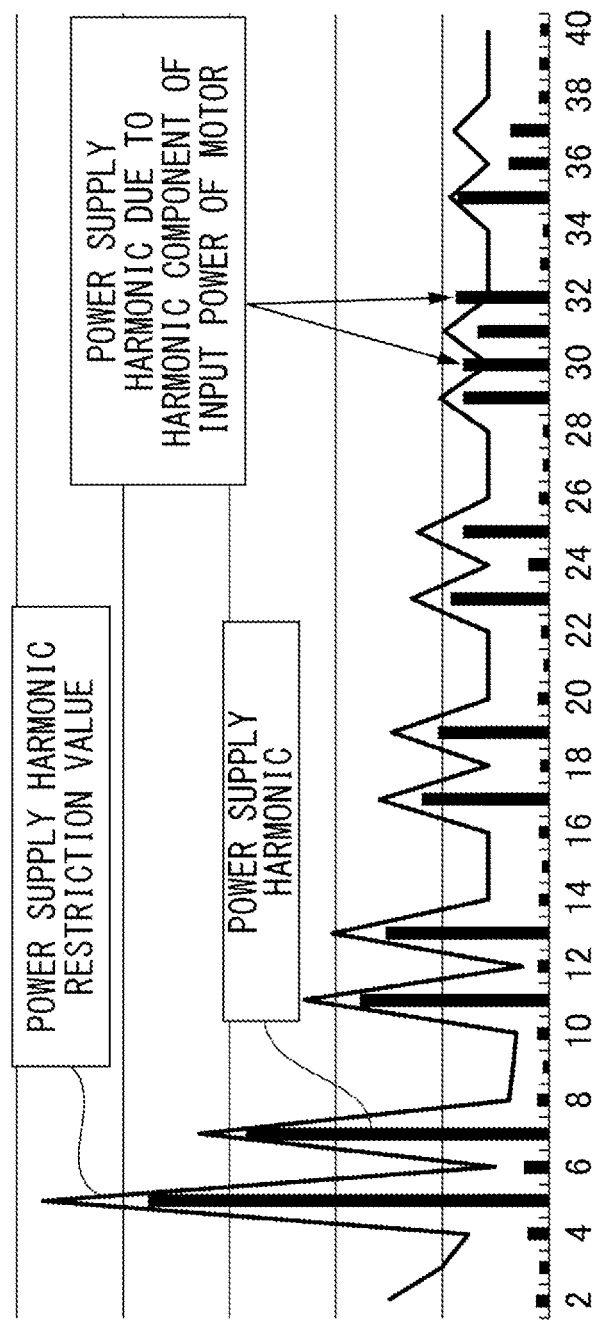
FIG. 1 is a graph illustrating an example of harmonics generated at an input side of an inverter circuit.

For example, when an inverter circuit having no internal energy storage element, such as a capacitorless inverter, is used, and the harmonic component is generated in the input power of the motor, a harmonic of the same order as the harmonic component generated in the input power of the motor may be generated at an input side of the inverter circuit. When this harmonic flows to a power supply provided at the input side of the inverter circuit, a harmonic (power supply harmonic) having a frequency corresponding to a frequency of a motor input power±a frequency of a power supply voltage, is included in a current on side of the power supply. For this reason, it is required to reduce the harmonic component of the input power of the motor, so that each power supply harmonic generated by the harmonic component of the input power of the motor becomes less than or equal to a power supply harmonic restriction value. FIG. 1 is a graph illustrating an example of harmonics generated at an input side of a power conversion circuit, where the abscissa indicates the order of the harmonics (multiple of the frequency of the power supply voltage). FIG. 1 illustrates that the thirtieth and thirty-second order power supply harmonics are the harmonic components generated in the input power of the motor, and exceeding the power supply harmonic restriction value.

The higher the motor speed becomes, the greater the amplitude of each power supply harmonic generated by the harmonic component of the input power of the motor becomes, thereby exceeding the power supply harmonic restriction value. For this reason, there is a technique to reduce the harmonic component of the input power of the motor, by directly manipulating a voltage command value applied to the inverter circuit.

Figure 2:
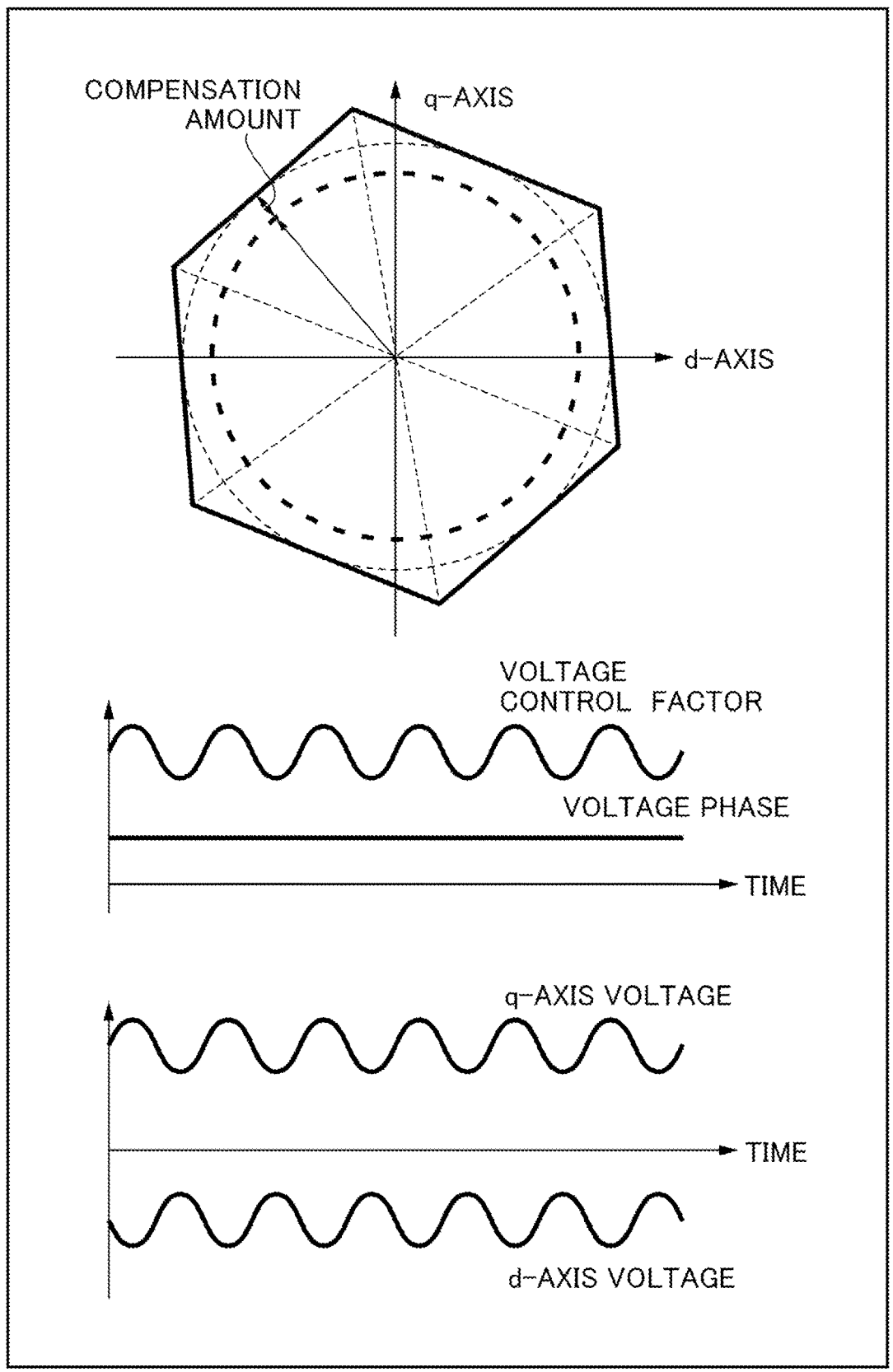
FIG. 2 is a diagram for explaining a first related art for reducing a harmonic component of an input power of a motor.
Figure 3:
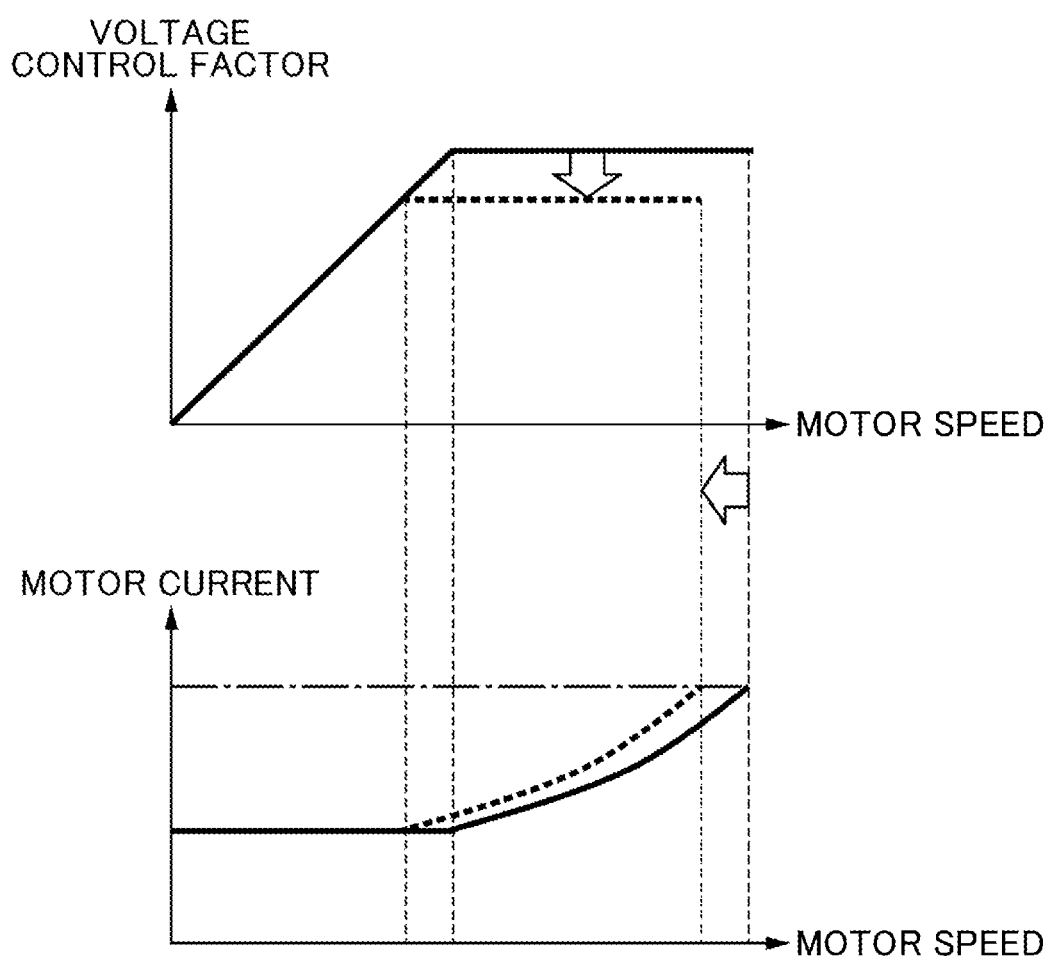
FIG. 3 is a diagram for explaining a variation an operating range of the motor due to a variation in a voltage control factor.

FIG. 2 is a diagram for explaining a first related art (Japanese Laid-Open Patent Publication No. 2010-98941) for reducing the harmonic component of the input power of the motor. The first related art adds a compensation amount for reducing the harmonic component of the input power of the motor, to a voltage control factor (also referred to as a modulation factor) of the inverter circuit. However, in order to reduce the harmonic component of the input power of the motor, it is necessary to reduce a direct current component of the voltage control factor so that the compensation amount does not saturate. Because a size of an operating range of the motor (for example, a maximum motor speed) is proportional to the direct current component of the voltage control factor, the operating range of the motor must inevitably be lowered as the compensation amount is increased (refer to FIG. 3).

Figure 4:
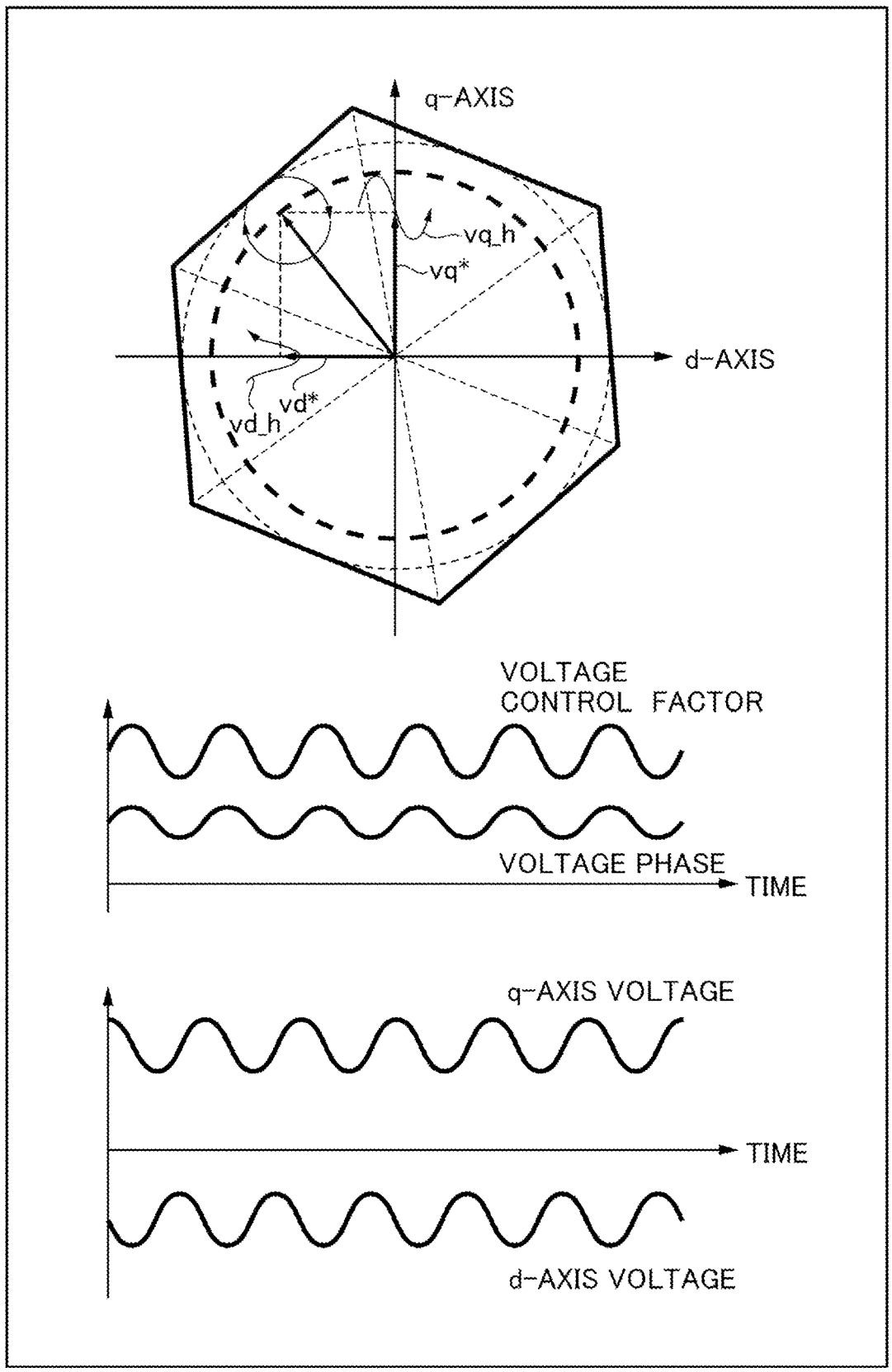
FIG. 4 is a diagram for explaining a second related art for reducing the harmonic component of the input power of the motor.

FIG. 4 is a diagram for explaining a second related art (Japanese Laid-Open Patent Publication No. 2012-165634) for reducing the harmonic component of the input power of the motor. In the second related art, a compensation value (d-axis compensation voltage vd_h and q-axis compensation voltage vq_h) that distorts a motor current is superimposed on an output of a current controller (command value (d-axis voltage command value vd* and q-axis voltage command value vq*) that controls the motor current), to generate a new voltage command values vd'* and vq'*. However, when a magnitude of the new voltage command values vd'* and vq'* varies due to the superimposing of the compensation value (d-axis compensation voltage vd_h and q-axis compensation voltage vq_h), the voltage control factor also varies. For this reason, similar to the first related art, the direct current component of the voltage control factor (magnitudes of voltage vectors made up of outputs (vd*, vq*) of the current controller) needs to be lowered so that the compensation value does not saturate, and thus, the operating range of the motor must inevitably be lowered (refer to FIG. 3).

Hence, in the first related art and the second related art, there is a trade-off between reducing the harmonic component of the input power of the motor and securing the operating range of the motor. A technique of the present disclosure can simultaneously reduce the harmonic component of the input power of the motor and secure the operating range of the motor.

Figure 5:
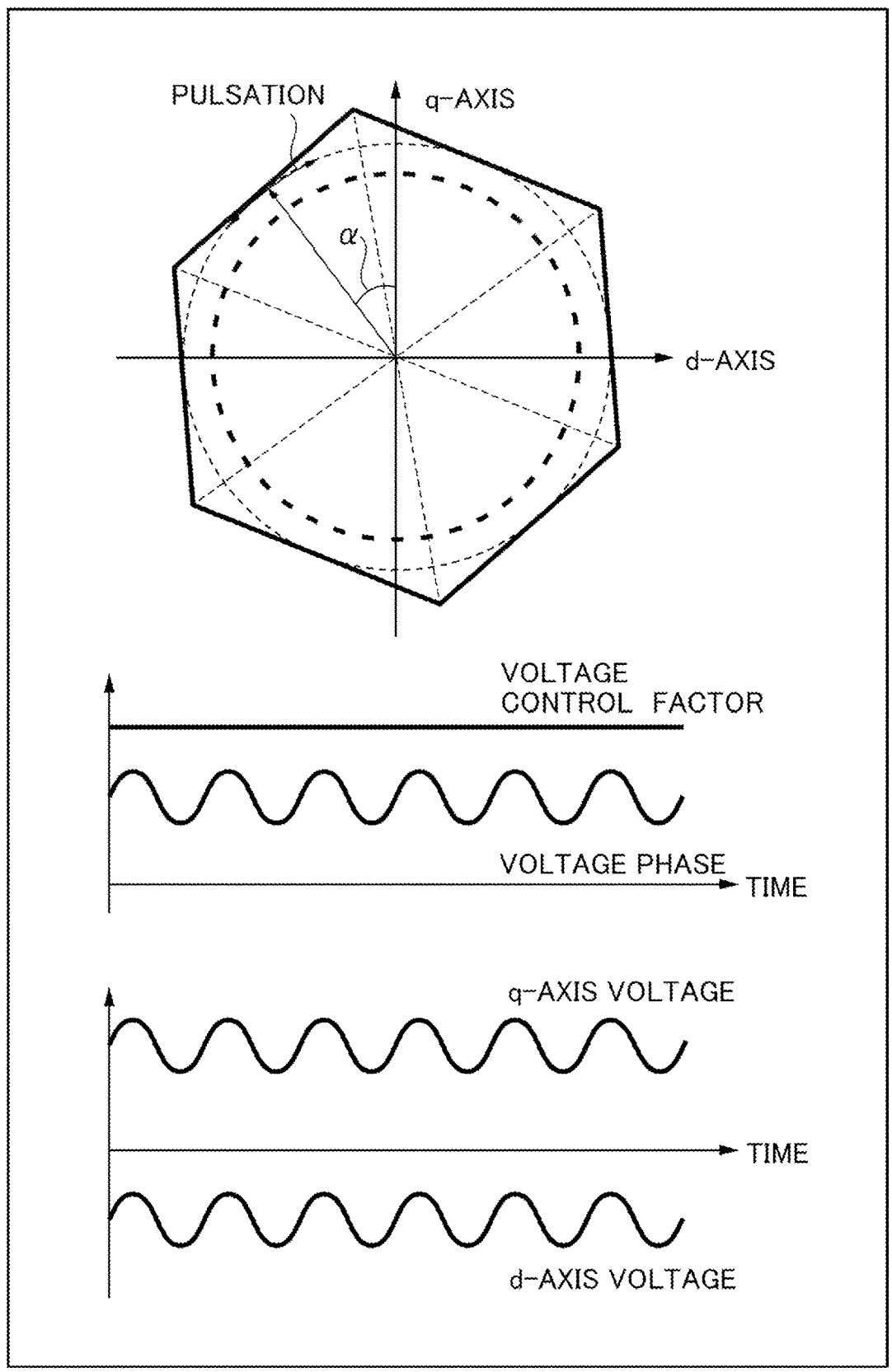
FIG. 5 is a diagram for explaining a technique of the present disclosure for reducing the harmonic component of the input power of the motor.

FIG. 5 is a diagram for explaining the technique of the present disclosure for reducing the harmonic component of the input power of the motor. In the technique of the present disclosure, the harmonic component generated in synchronism with the motor speed is detected in the input power of the motor, and a phase of an alternating current voltage output from the inverter circuit is varied at the same frequency as the detected harmonic component, so as to reduce the harmonic component. As illustrated in FIG. 5, in the technique of the present disclosure, the voltage control factor is not varied, and an operation is performed to cause pulsation of a phase α of the entire voltage vector (resultant vector of d-axis voltage and q-axis voltage) at the same frequency as the detected harmonic component.

Operating the phase α at the same frequency as the harmonic component of the input power of the motor, is equivalent to causing a transition of loci of the d-axis voltage and q-axis voltage on the same arc at the same frequency as the harmonic component of the input power of the motor. In addition, when the phase α is operated at the same frequency as the harmonic component of the input power of the motor, a harmonic component obtained by adding a driving frequency of the motor to the frequency of the harmonic component of the input power of the motor, and the harmonic component obtained by subtracting the driving frequency of the motor from the harmonic component of the input power of the motor, appear with the same amplitude in the alternating current voltage output from the inverter circuit.

For example, formulas 1, 2, and 3 represent u-phase alternating current voltages output from the inverter circuit when the pulsation of the phase α of the entire voltage vector is caused.

[Mathematical Expression 1]

$$v_u = -V_u \sin(\theta_e + \delta') \quad \text{Formula 1}$$

$$\delta' = \delta + A\sin(6\theta_e + B) \quad \text{Formula 2}$$

$$\begin{aligned} v_u &= -V_u \sin(\theta_e + \delta + A\sin(6\theta_e + B)) \quad \text{Formula 3} \\ &= -V_u \sin(\theta_e + \delta)\cos\{A\sin(6\theta_e + B)\} - V_u \cos(\theta_e + \delta)\sin\{A\sin(6\theta_e + B)\} \\ &\approx -V_u \sin(\theta_e + \delta) - V_u \cos(\theta_e + \delta)A\sin(6\theta_e + B) \\ &= -V_u \sin(\theta_e + \delta) - AV_u \sin(\theta_e + \delta + 6\theta_e + B) + AV_u \sin(\theta_e + \delta - 6\theta_e - B) \\ &= -V_u \sin(\theta_e + \delta) - \frac{1}{2}AV_u \sin(5\theta_e - \delta + B) - \frac{1}{2}AV_u \sin(7\theta_e + \delta + B) \end{aligned}$$

$v_u$ denotes the u-phase alternating current voltage (u-phase voltage of the motor) output from the inverter circuit, $V_u$ denotes the amplitude of the u-phase voltage, $\theta_e$ denotes a rotation angle (electric angle) of a rotor of the motor, and δ' denotes a difference (voltage phase) between the phase of the alternating current voltage output from the inverter circuit and the rotation angle of the rotor of the motor. A sin(6$\theta_e$+B) represents a compensation amount (hereinafter also referred to as a compensation amount C) that compensates for a voltage phase reference value δ, in order to compensate for the harmonics in the input power of the motor, where A denotes an amplitude of the compensation amount C, and B denotes a reference phase of the compensation amount C.

When the formula 2 is substituted into the formula 2, the formula 3 is obtained. An amplitude "−(½)$AV_u$" of a second term of the formula 3 corresponds to the amplitude of the harmonic component, which is obtained by subtracting the driving frequency of the motor from the frequency of the harmonic component of the input power of the motor. An amplitude "−(½)$AV_u$" of a third term of the formula 3 corresponds to the amplitude of the harmonic component, which is obtained by adding the driving frequency of the motor to the frequency of the harmonic component of the input power of the motor.

The formulas 1, 2, and 3 illustrate a case where the pulsation of the entire voltage vector is caused by a sine wave, but the pulsation of the entire voltage vector may be caused by other periodic waveforms, such as triangular wave, a square wave, or the like.

Next, it is theoretically derived that the harmonic component generated in the input power of the motor can be reduced, by varying the phase of the alternating current voltage output from the inverter circuit at the same frequency as the harmonic component generated in synchronism with the motor speed in the input power of the motor. As an example, the present disclosure is applied to a permanent magnet synchronous motor, but the present disclosure may be applied to other types of motors. In addition, although the examples described below reduces the harmonic component that is 6 times the driving frequency of the motor, it is possible to reduce higher order harmonic components, such as 12 times the driving frequency, 18 times the driving frequency, or the like.

A voltage equation of the permanent magnet synchronous motor is expressed by formulas 4 and 5.

[Mathematical Expression 2]

$$\begin{bmatrix} v_d \\ v_q \end{bmatrix} = \begin{bmatrix} R_a + L_d s & -\omega_e L_q \\ \omega_e L_d & R_a + L_q s \end{bmatrix} \begin{bmatrix} i_d \\ i_q \end{bmatrix} + \omega_e \begin{bmatrix} -\phi_q \\ \phi_d \end{bmatrix} \quad \text{Formula 4}$$

$$\begin{bmatrix} \phi_q \\ \phi_d \end{bmatrix} = \begin{bmatrix} K_{q6} \sin 6\theta_e \\ \Lambda_a + K_{d6} \cos 6\theta_e \end{bmatrix} \quad \text{Formula 5}$$

$v_d$ denotes the d-axis voltage, $v_q$ denotes the q-axis voltage, $R_a$ denotes a winding resistance of an armature of the motor, $L_d$ denotes a d-axis inductance, $L_q$ denotes a q-axis inductance, $i_d$ denotes a d-axis current, $i_q$ denotes a q-axis current, $\omega_e$ denotes the electric angular velocity of the motor, s denotes an operator of time derivative, $\varphi_d$ denotes a d-axis magnetic flux, $\varphi_q$ denotes a q-axis magnetic flux, $K_{q6}$ denotes an amplitude of the q-axis magnetic flux, $K_{d6}$ denotes an amplitude of the d-axis magnetic flux, and $\Lambda_a$ denotes a magnetic flux of the permanent magnet.

In the permanent magnet synchronous motor, because the effects of the power supply harmonic become more notable as the motor speed becomes higher, the effects of the winding resistance $R_a$ of the armature can be neglected as the motor speed becomes higher. Hence, for the sake of simplifying the description, the formula 4 is transformed into a formula 6.

[Mathematical Expression 3]

$$\begin{bmatrix} v_d \\ v_q \end{bmatrix} \approx \begin{bmatrix} L_d s & -\omega_e L_q \\ \omega_e L_d & L_q s \end{bmatrix} \begin{bmatrix} i_d \\ i_q \end{bmatrix} + \omega_e \begin{bmatrix} -\phi_q \\ \phi_d \end{bmatrix} \quad \text{Formula 6}$$

The d-axis voltage $v_d$ and q-axis voltage $v_q$ are defined as represented by formulas 7 and 8, to cause a sine-wave-like pulsation of the phase of the alternating current voltage. $V_a$ denotes the amplitudes of the d-axis voltage $v_d$ and the q-axis voltage $v_q$. Substitution of the formula 8 into the formula 7 results in a formula 9.

[Mathematical Expression 4]

$$\begin{bmatrix} v_q \\ v_d \end{bmatrix} = V_a \begin{bmatrix} -\sin \delta' \\ \cos \delta' \end{bmatrix} \quad \text{Formula 7}$$

$$\delta' = \delta + A \sin(6\theta_e + B) \quad \text{Formula 8}$$

$$\Rightarrow \begin{bmatrix} v_q \\ v_d \end{bmatrix} = V_a \begin{bmatrix} -\sin \delta \cos\{A \sin(6\theta_e + B)\} - \\ \cos \delta \sin\{A \sin(6\theta_e + B)\} \\ \cos \delta \cos\{A \sin(6\theta_e + B)\} - \\ \sin \delta \sin\{A \sin(6\theta_e + B)\} \end{bmatrix} \quad \text{Formula 9}$$

$$\approx V_a \begin{bmatrix} -\sin \delta - A \cos \delta (\sin 6\theta_e \cos B + \cos 6\theta_e \sin B) \\ \cos \delta - A \sin \delta (\sin 6\theta_e \cos B + \cos 6\theta_e \sin B) \end{bmatrix}$$

$$= \begin{bmatrix} V_{d0} \\ V_{q0} \end{bmatrix} + \begin{bmatrix} V_{d6c} \cos 6\theta_e + V_{d6s} \sin 6\theta_e \\ V_{q6c} \cos 6\theta_e + V_{q6s} \sin 6\theta_e \end{bmatrix}$$

$V_{d0} = -V_a \sin \delta$ $V_{q0} = V_a \cos \delta$ $V_{d6c} = -V_a A \cos \delta \sin B = -A V_{q0} \sin B$ $V_{d6s} = -V_a A \cos \delta \cos B = -A V_{q0} \cos B$ $V_{q6c} = -V_a A \sin \delta \sin B = A V_{d0} \sin B$ $V_{q6s} = -V_a A \sin \delta \cos B = A V_{d0} \cos B$ A formula 10 is obtained by solving simultaneous equations formed by the formulas 6 and 9 for the current.

[Mathematical Expression 5]

$$\begin{bmatrix} i_d \\ i_q \end{bmatrix} = \frac{1}{L_d L_q s^2 + \omega_e^2 L_d L_q} \begin{bmatrix} L_q s & \omega_e L_q \\ -\omega_e L_d & L_d s \end{bmatrix} \begin{bmatrix} v_d + \omega_e \phi_q \\ v_q - \omega_e \phi_d \end{bmatrix} \approx \quad \text{Formula 10}$$

$$\begin{bmatrix} I_{d0} \\ I_{q0} \end{bmatrix} + \begin{bmatrix} I_{d6c} \cos 6\theta_e + I_{d6s} \sin 6\theta_e \\ I_{q6c} \cos 6\theta_e + I_{q6s} \sin 6\theta_e \end{bmatrix}$$

$$I_{d0} = \frac{1}{\omega_e L_d L_q} L_q (V_{q0} - \omega_e \Lambda_a)$$

$$I_{q0} = -\frac{1}{\omega_e L_d L_q} L_d V_{d0}$$

$$I_{d6c} = -\frac{1}{35 \omega_e L_d L_q} L_q \{6 V_{d6s} + V_{q6c} + \omega_e (6 K_{q6} - K_{d6})\}$$

$$I_{d6s} = -\frac{1}{35 \omega_e L_d L_q} L_q (V_{q6s} - 6 V_{d6c})$$

$$I_{q6c} = -\frac{1}{35 \omega_e L_d L_q} L_q (V_{q6s} - V_{d6c})$$

$$I_{q6s} = -\frac{1}{35 \omega_e L_d L_q} L_d \{-V_{d6s} - 6 V_{q6c} + \omega_e (6 K_{d6} - K_{q6})\}$$

A formula 11 is obtained by determining an input power $P_{in}$ of the motor.

[Mathematical Expression 6]

$$P_{in} = v_d i_d + v_q i_q \approx P_{in0} + P_{in6c} \cos 6\theta_e + P_{in6s} \sin 6\theta_e + P_{in12c} \cos 12\theta_e + P_{in12s} \sin 12\theta_e \quad \text{Formula 11}$$

Of the input power $P_{in}$ represented by the formula 11, a power $P_{in6}$ of the sixth order harmonic component can be transformed into a formula 12 (power of the 12th order harmonic component is negligibly small).

[Mathematical Expression 7]

$$P_{in6} = P_{in6c} \cos 6\theta_e + P_{in6s} \sin 6\theta_e \quad \text{Formula 12}$$
$$= (V_{d0} I_{d6c} + V_{q0} I_{q6c} + V_{d6c} I_{d0} + V_{q6c} I_{q0}) \cos 6\theta +$$
$$(V_{d0} I_{d6s} + V_{q0} I_{q6s} + V_{d6s} I_{d0} + V_{q6s} I_{q0}) \sin 6\theta_e$$
$$= (M_1 A \cos B + M_2 A \sin B + M_3) \cos 6\theta +$$
$$(M_2 A \cos B - M_1 A \sin B + M_4) \sin 6\theta_e$$

$$M_1 = \frac{1}{35 \omega_e L_d L_q} \{6(L_q - L_d) V_{d0} V_{q0}\}$$

$$M_2 = \frac{1}{35 \omega_e L_d L_q} \{(-35 L_q (V_{q0} - \omega_e \Lambda_a) - L_d V_{q0}) V_{q0} + (-35 L_d - L_q) V_{d0}^2\}$$

$$M_3 = \frac{1}{35 \omega_e L_d L_q} \{-\omega_e L_q V_{d0} (6 K_{q6} - K_{d6})\}$$

$$M_4 = \frac{1}{35 \omega_e L_d L_q} \{-\omega_e L_d V_{q0} (6 K_{d6} - K_{q6})\}$$

Figure 6:
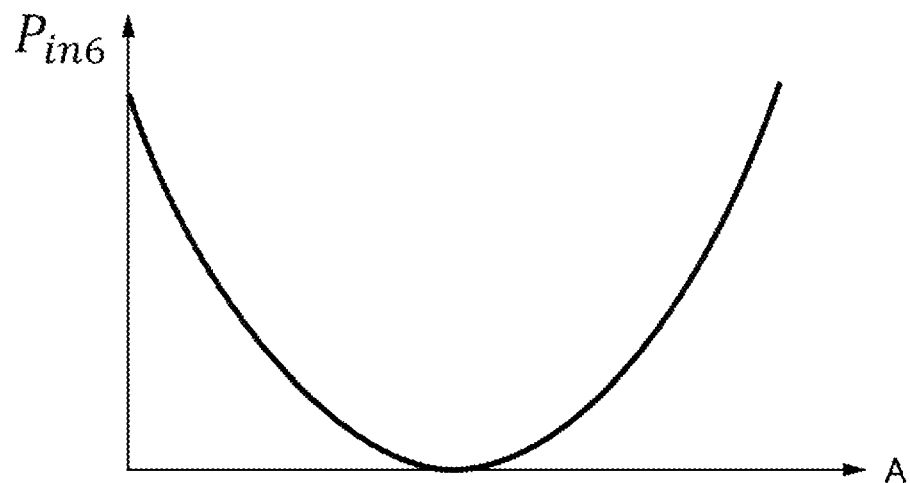
FIG. 6 is a diagram illustrating an example of a relationship between an amplitude manipulated variable and a power of a sixth order harmonic component.
Figure 7:
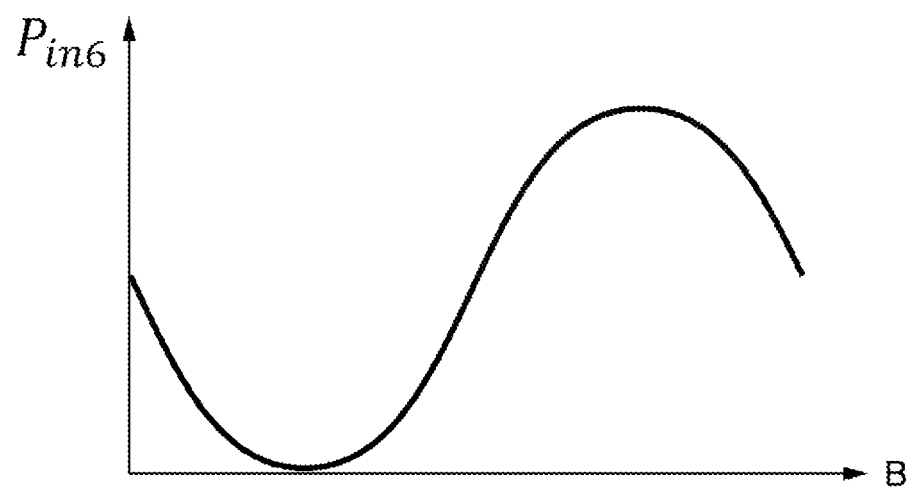
FIG. 7 is a diagram illustrating an example of a relationship between a phase manipulated variable and the power of the sixth order harmonic component.

FIG. 6 illustrates an example of a relationship between the amplitude A and the power $P_{in6}$ of the sixth order harmonic component when the reference phase B is fixed in the formula 12. FIG. 7 illustrates an example of a relationship between the reference phase B and the power $P_{in6}$ of the sixth order harmonic component when the amplitude A is fixed in the formula 12. According to FIG. 6 and FIG. 7, it may be seen that, for each of the amplitude A and the reference phase B in the compensation amount C, an optimum value exists which makes the power $P_{in6}$ of the sixth order harmonic component approach zero. Hence, by adjusting the amplitude A and the reference phase B in the compensation amount C to the optimum values which make the power $P_{in6}$ of the sixth harmonic component approach zero, respectively, it is possible to reduce the power $P_{in6}$ of the sixth harmonic component.

When conditions which make the power $P_{in6}$ of the sixth order harmonic component zero are determined in the formula 12, an amplitude of a cosine component in a first term of the formula 12 is set to zero, and an amplitude of a sine component in a second term of the formula 12 is set to zero, as represented by a formula 13. A formula 15 is obtained by solving simultaneous equations formed by the formulas 13 and 14 for the amplitude A and the reference phase B.

[Mathematical Expression 8]

$$\begin{cases} M_1 A \cos B + M_2 A \sin B + M_3 = 0 & M_1 X + M_2 Y + M_3 = 0 & X = A \cos B \\ M_2 A \cos B - M_1 A \sin B + M_4 = 0 & M_2 X - M_1 Y + M_4 = 0 & Y = A \sin B \end{cases}$$
Formula 13

$$(M_1^2 + M_2^2)X + M_1 M_3 + M_2 M_4 = 0$$
$$(M_1^2 + M_2^2)Y + M_2 M_3 - M_1 M_4 = 0$$
$$X = -\frac{M_1 M_3 + M_2 M_4}{M_1^2 + M_2^2}$$
$$Y = -\frac{M_2 M_3 - M_1 M_4}{M_1^2 + M_2^2}$$
Formula 14

$$\boxed{A = \sqrt{X^2 + Y^2} = \sqrt{\frac{M_3^2 + M_4^2}{M_1^2 + M_2^2}} \quad B = \tan^{-1} \frac{Y}{X} = \tan^{-1} \frac{-M_1 M_3 - M_2 M_4}{-M_2 M_3 + M_1 M_4}}$$
Formula 15

Accordingly, in the technique of the present disclosure, the power $P_{in6}$ of the sixth order harmonic component can be made zero, by adjusting each of the amplitude A and the reference phase B to the appropriate values represented by the formula 15. However, the technique of the present disclosure may detect the harmonic component generated in synchronism with the motor speed in the input power of the motor, and adjust at least one of the amplitude A and the reference phase B according to the detected harmonic component by the hill climbing method or the like, so as to reduce the harmonic.

With a manipulated variable for making the sixth order harmonic component of the input power of the motor zero, the sixth order component of the motor current in a rotating coordinate does not become zero. The sixth order component of the input power of the motor can be made zero, by varying at least one of the amplitude and the phase of the sixth order component of the motor current in the rotating coordinate, so that the sixth order components of the input power with respect to the d-axis and the input power with respect to the q-axis are adjusted to assume opposite phases.

Next, a configuration example of a power conversion apparatus applied with the technique of the present disclosure will be described.

Figure 10:
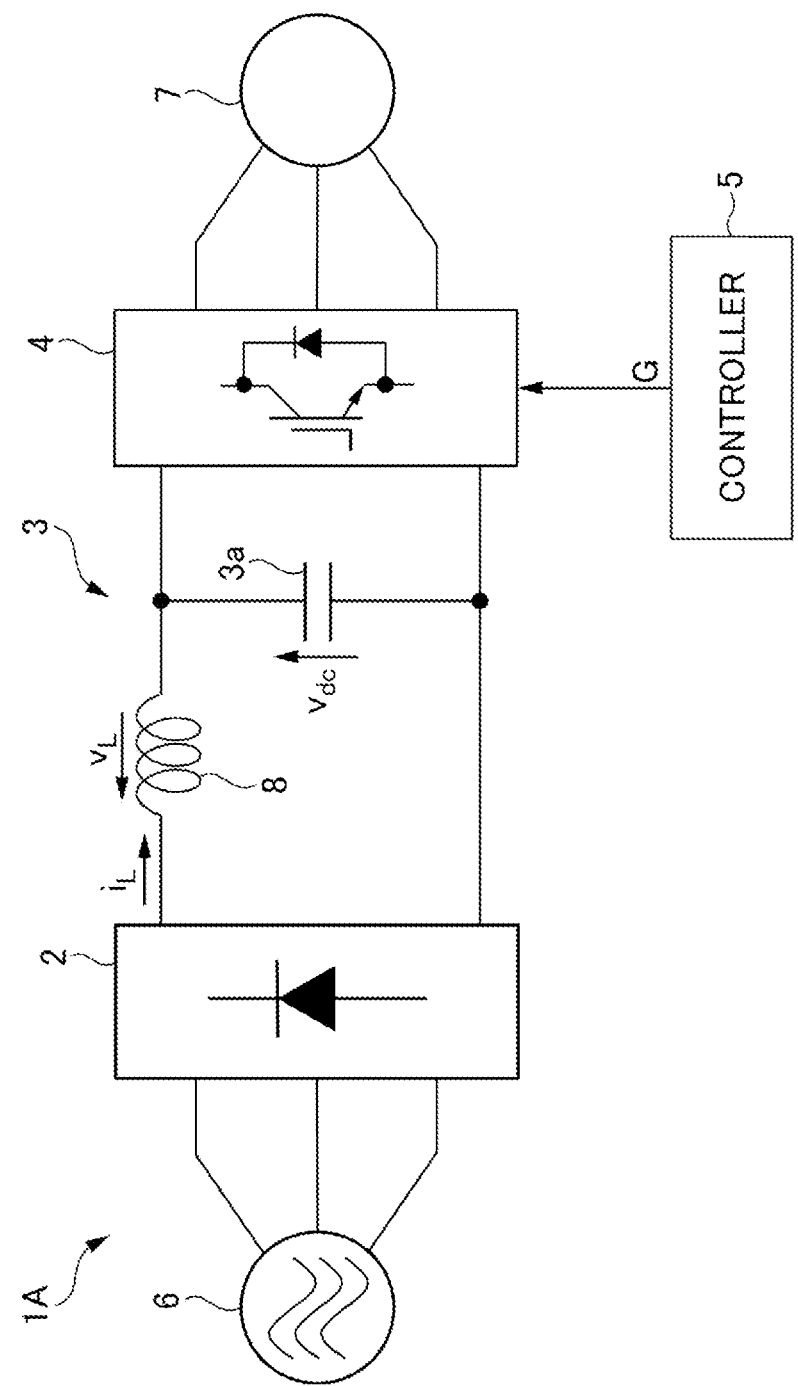
FIG. 10 is a diagram illustrating a first configuration example of a power conversion apparatus.

FIG. 10 is a block diagram illustrating a first configuration example of the power conversion apparatus applied with the technique of the present disclosure. A power conversion apparatus 1A illustrated in FIG. 10 includes a converter circuit 2, a direct current link part 3, an inverter circuit 4, and a controller 5, and converts an input alternating current power supplied from a three-phase alternating current power supply 6 into an output alternating current power of a predetermined voltage and a predetermined frequency, to supply the output alternating current power to a motor 7.

The motor 7 is a three-phase alternating current motor, for example, is used to drive a compressor provided in a refrigerant circuit of an air conditioner. More particularly, the motor 7 is a concentrated winding motor, such as a 4-pole 6-slot, a 6-pole 9-slot, or the like. This motor 7 has a tendency to include large amounts of fifth and seventh order components of the fundamental wave, as the harmonic components of an induced voltage. The higher order (for example, sixth order) harmonic components caused by the motor voltage distortion (the fifth and seventh order harmonic components of the fundamental wave) also appear in a power supply current of the alternating current power supply 6 and a direct current link voltage $v_{dc}$ in the direct current link part 3.

The converter circuit 2 is connected to the alternating current power supply 6, and converts an alternating current output of the alternating current power supply 6 into a direct current output. The converter circuit 2 is a diode bridge circuit in which multiple (in this example, six) diodes make a bridge connection, for example. These diodes convert an alternating current voltage of the alternating current power supply 6 into a direct current voltage, through a full wave rectification. The converter circuit 2 may be a voltage conversion circuit of a circuit type other than the diode bridge, as long as the circuit supplies the direct current power after the conversion to the inverter circuit 4 through the direct current link part 3.

The direct current link part 3 includes a capacitor 3a connected between the converter circuit 2 and the inverter circuit 4. The capacitor 3a is connected in parallel to an output part of the converter circuit 2, and a direct current voltage (direct current link voltage $v_{dc}$) generated across both ends of the capacitor 3a is input to an input node of the inverter circuit 4. The capacitor 3a will further be described later.

The direct current link part 3 includes a reactor 8 connected between the converter circuit 2 and the inverter circuit 4. The reactor 8 is inserted in series to a direct current bus between the output part of the converter circuit 2 and an input part of the inverter circuit 4.

The inverter circuit 4 has the input node connected in parallel to the capacitor 3a of the direct current link part 3, and switches an output of the direct current link part 3 to make a conversion into a three-phase alternating current, to supply the three-phase alternating current to the motor 7 connected thereto. The inverter circuit 4 according to the present embodiment is configured to include multiple switching elements making a bridge connection. The inverter circuit 4 includes six switching elements because the inverter circuit 4 outputs the three-phase alternating current to the motor 7. More particularly, the inverter circuit 4 includes three switching legs connected in parallel to each other, and each switching leg has two switching elements connected in series to each other. A mid point between the switching element of an upper arm and the switching element of a lower arm in each of the switching legs is connected to a coil of each of the phases of the motor 7, respectively. In addition, each switching element has a reflux diode making an antiparallel connection therewith. The inverter circuit 4 switches the direct current link voltage $v_{dc}$ input from the direct current link part 3, to make the conversion into the three-phase alternating current voltage by on and off operations of these switching elements, and supplies the three-phase alternating current voltage to the motor 7. The on and off operations are controlled by the controller 5.

The controller 5 detects the harmonic component generated in synchronism with the speed of the motor 7 in the input power of the motor 7, and varies the phase of the alternating current voltage output from the inverter circuit 4, at the same frequency as the detected harmonic component, so as to reduce the harmonic component. The controller 5 controls the switching (on and off operations) of the inverter circuit 4, so that the phase of the alternating current voltage varies as described above.

Figure 11:
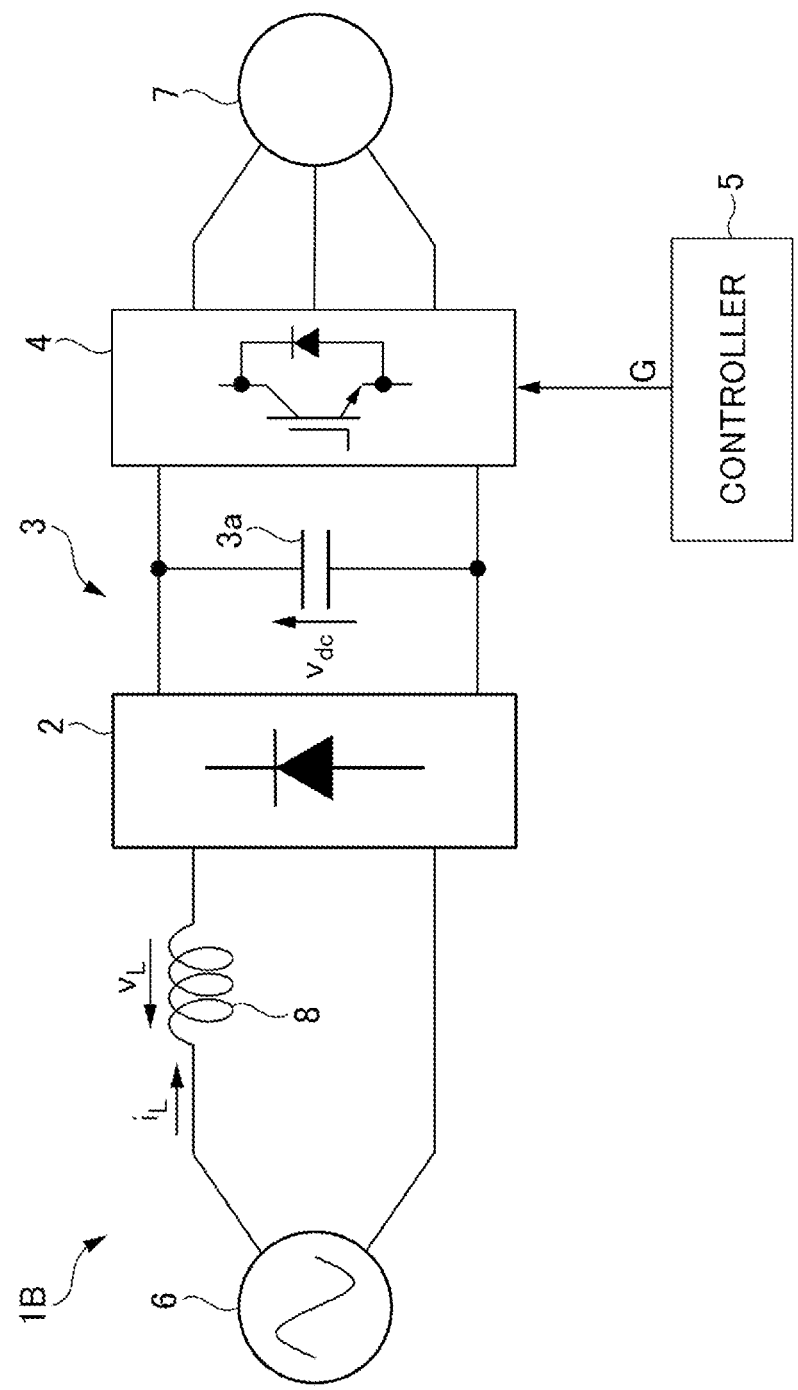
FIG. 11 is a diagram illustrating a second configuration example of the power conversion apparatus.

FIG. 11 is a diagram illustrating a second configuration example of the power conversion apparatus applied with the technique of the present disclosure. A description of the configuration similar to that of the first configuration example will be omitted, by reference to the above description. A power conversion apparatus 1B illustrated in FIG. 11 includes the converter circuit 2, the direct current link part 3, the inverter circuit 4, and the controller 5, and converts an input alternating current power supplied from a single-phase alternating current power supply 6 into an output alternating current power having a predetermined voltage and a predetermined frequency, and supplies the output alternating current power to the motor 7.

The converter circuit 2 is connected to the alternating current power supply 6 through the reactor 8, and rectifies (converts) the alternating current output from the power supply 6 into the direct current. The converter circuit 2 is a diode bridge circuit in which multiple (in this example, four) diodes make a bridge connection, for example. These diodes convert an alternating current voltage of the alternating current power supply 6 into a direct current voltage, through a full wave rectification. The converter circuit 2 may be a voltage conversion circuit of a circuit type other than the diode bridge, as long as the circuit supplies the direct current power after the conversion to the inverter circuit 4 through the direct current link part 3.

The reactor 8 is connected between the alternating current power supply 6 and the converter circuit 2, and more particularly, is inserted in series between an alternating current output side of the alternating current power supply 6 and an alternating current input side of the converter circuit 2.

In FIG. 10 and FIG. 11, a capacitance value of the capacitor 3a is set so that the output of the converter circuit 2 can hardly be smoothened, while a ripple voltage caused by the switching operation of the inverter circuit 4 (voltage variation according to a switching frequency $f_c$) can be reduced. More particularly, the capacitor 3a is formed by a small capacitance capacitor (for example, a film capacitor) having a capacitance value (for example, approximately several tens to approximately several hundred μF) that is approximately 0.01 times a capacitance value of a smoothing capacitor (for example, an electrolytic capacitor) used for smoothing the output of the converter circuit 2 in a general power conversion apparatus.

Because the capacitance value of the capacitor 3a is small as described above, the output of the converter circuit 2 is hardly smoothened in the direct current link part 3, and as a result, a pulsation component according to the frequency of the power supply voltage $v_{in}$ of the alternating current power supply 6 remains in the direct current voltage (direct current link voltage $v_{dc}$). For example, the direct current link voltage $v_{dc}$ has a pulsation component having a frequency that is six times the frequency of the power supply voltage vin in the case of the three-phase alternating current power supply 6 of FIG. 10, and two times the frequency of the power supply voltage $v_{in}$ in the case of the single-phase alternating current power supply 6 of FIG. 11.

Moreover, when not only the capacitor 3a but also the reactor 8 is used in the power conversion apparatus, an LC filter is famed by the reactor 8 and the capacitor 3a. An inductance of the reactor 8 and the capacitance value of the capacitor 3a are set, so that a resonant frequency $f_r$ of the LC filter is higher than or equal to N times a commercial frequency $f_{in}$ of the N-phase alternating current power supply 6, and the ripple voltage caused by the switching operation of the inverter circuit 4 is attenuated.

$$N \times f_{in} <= f_r <= f_c/4$$

$$f_r = 1/(2\Pi\sqrt{LC})$$

L denotes the inductance of the reactor 8, and C denotes the capacitance value of the capacitor 3a.

When the power conversion apparatus is a capacitorless inverter (more particularly, an electrolytic capacitorless inverter) in which the capacitance value of the capacitor 3a of the direct current link part 3 has such a small value, the harmonic caused by a distortion component (harmonic component) generated in the input power of the motor 7 may leak to the power supply side. Similarly, when the power conversion apparatus is a matrix converter, the harmonic caused by the distortion component in the input power of the motor may leak to the power supply side.

The controller 5 has a function (harmonic component reducing function) which varies the phase of the alternating current voltage output from the inverter circuit 4, at the same frequency as the harmonic component, so as to reduce the harmonic component generated in synchronism with the speed of the motor 7 in the input power of the motor 7. By this harmonic component reducing function, it is possible to reduce the harmonic that is generated at the input side of the inverter circuit 4 (for example, the power supply harmonic that leaks to the power supply side).

Next, a configuration example of the controller 5 having the harmonic component reducing function will be described.

Figure 12:
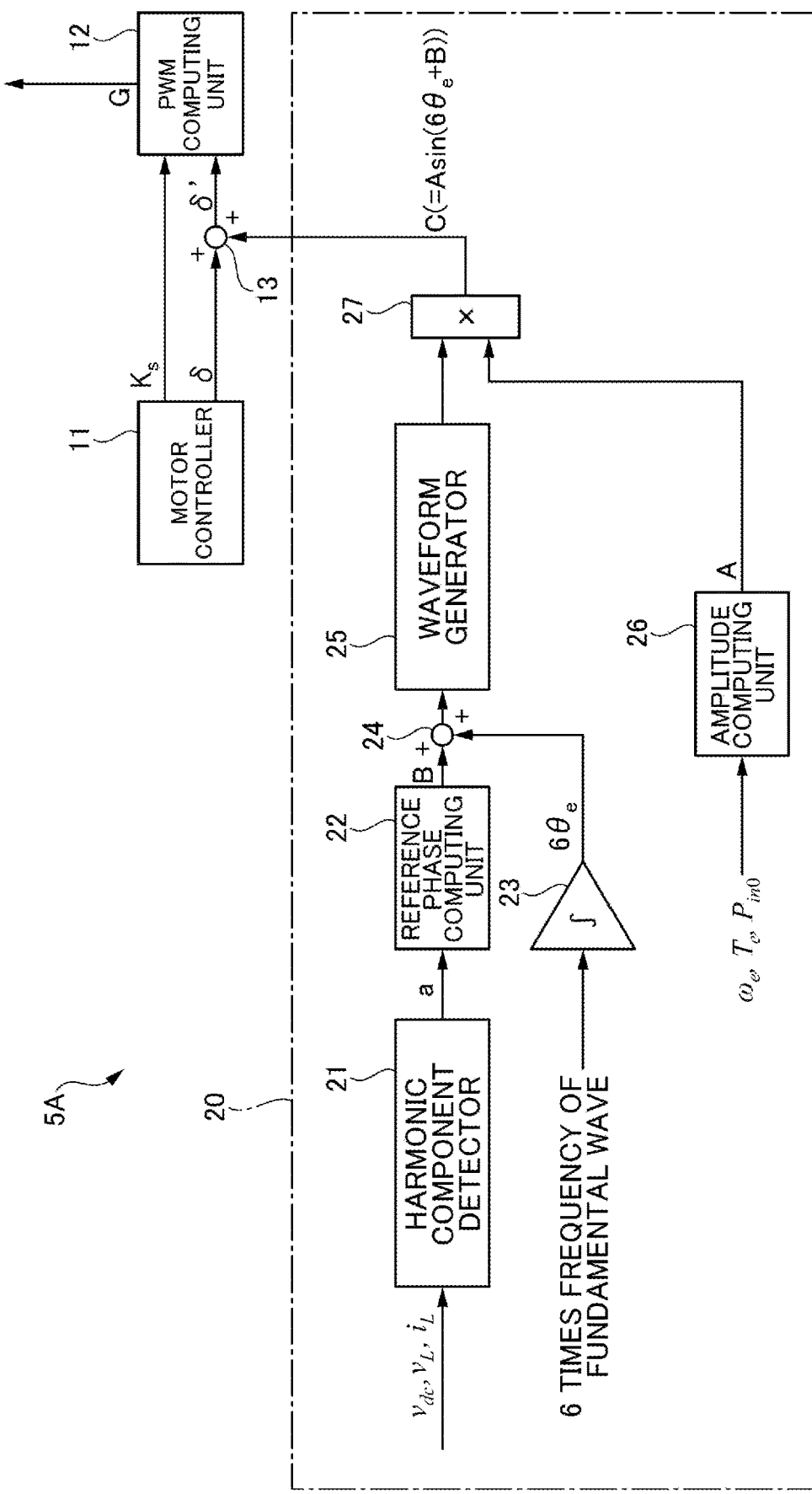
FIG. 12 is a diagram illustrating a first configuration example of a controller.

FIG. 12 is a block diagram illustrating a first configuration example of the controller. A controller 5A illustrated in FIG. 12 is an example of the controller 5. The controller 5A outputs a gate signal G, which is a control signal for controlling the on and off operations of each of the switching elements in the inverter circuit 4, to the inverter circuit 4. The controller 5A includes a motor controller 11, a compensation unit 20, an adder 13, and a PWM computing unit 12. Functions of each of these parts included in the controller 5A are realized by a processor (for example, a CPU (Central Processing Unit)) by executing a program that is readably stored in a memory.

The motor controller 11 generates and outputs the voltage phase reference value δ for controlling the phase of the alternating current voltage output from the inverter circuit 4, and a voltage control factor $K_s$ of the inverter circuit 4. The voltage control factor is also referred to as a modulation factor.

The compensation unit 20 compensates for the harmonic of the input power of the motor 7. The compensation unit 20 detects the harmonic component generated in synchronism with the speed of the motor 7 in the input power of the motor 7, and varies the phase of the alternating current voltage output from the inverter circuit 4, at the same frequency as the detected harmonic component, so as to reduce the harmonic component. The compensation unit 20 generates a compensation amount C (=A sin(6θ$_e$+B)) which varies at the same frequency as the detected harmonic component, and varies a phase δ' of the alternating current voltage output from the inverter circuit 4 at the same frequency as the detected harmonic component, based on the compensation amount C.

In this example, the compensation unit 20 adjusts the reference phase B of the compensation amount C according to an amplitude a of the detected harmonic component, and varies the amplitude A of the compensation amount C according to one of the speed (electric angular velocity ω$_e$) of the motor 7, an output torque T$_e$ of the motor 7, and an input power P$_{in0}$ of the motor 7. The compensation unit 20 includes the harmonic component detector 21, a reference phase computing unit 22, an integrator 23, an adder 24, a waveform generator 25, an amplitude computing unit 26, and a multiplier 27.

The harmonic component detector 21 detects the amplitude a of the harmonic component generated in synchronism with the speed of the motor 7 in the input power of the motor 7, by a Fourier transform or the like. Because a harmonic of the same order as the sixth order harmonic component generated in the input power of the motor 7 is generated in the power at the input side of the inverter circuit, the harmonic component detector 21 detects the amplitude a of the harmonic component generated in the input power of the motor 7 from the direct current link voltage v$_{dc}$ across both ends of the capacitor 3a, for example. Alternatively, the harmonic component detector 21 may detect the amplitude a of the harmonic component generated in the input power of the motor 7 from a reactor voltage v$_L$ across both ends of the reactor 8. Alternatively, the harmonic component detector 21 may detect the amplitude a of the harmonic component generated in the input power of the motor 7 from a reactor current i$_L$ flowing through the reactor 8. Alternatively, the harmonic component detector 21 may actually monitor the input power of the motor 7, and detect the amplitude a of the harmonic component generated in the input power of the motor 7 from the monitored value.

The harmonic component detector 21 acquires a signal for detecting the amplitude a of the harmonic component during a period in which the voltage vector of the inverter circuit 4 does not vary (for example, during a period in which the voltage vector having a zero magnitude is output). Hence, a detection accuracy of the amplitude a is improved compared to the a where the signal for detecting the amplitude a is acquired during a period in which the voltage vector varies.

The reference phase computing unit 22 adjusts the reference phase B of the compensation amount C according to the amplitude a of the harmonic component detected by the harmonic component detector 21. The reference phase computing unit 22 adjusts the reference phase B of the compensation amount C using the hill climbing method, so that the detected amplitude a becomes smaller according to the amplitude a detected by the harmonic component detector 21. Hence, it is possible to obtain an optimum reference phase B (an example of a target value of the reference phase B) for reducing the amplitude of the harmonic component generated in the input power of the motor 7.

On the other hand, the compensation unit 20 generates 6θ$_e$ by integrating a six times frequency of the speed (electric angular velocity ω$_e$) of the motor 7 by the integrator 23. The reference phase B computed by the reference phase computing unit 22, and the 6θ$_e$ obtained by the integrator 23, are added by the adder 24 to obtain (6θ$_e$+B). The waveform generator 25 generates a sine wave sin(6θ$_e$+B) having a phase (6θ$_e$+B) and synchronized to the speed of the motor 7. Although this example causes the pulsation by the sine wave, other periodic waveforms, such as a triangular wave, a square wave, or the like having a phase (6θ$_e$+B) may be used.

The amplitude computing unit 26 varies the amplitude A of the compensation amount C according to one of the speed (electric angular velocity ω$_e$) of the motor 7, the output torque T$_e$ of the motor 7, and the input power P$_{in6}$ of the motor 7. The amplitude computing unit 26 generates an optimum amplitude A (an example of a target value of the amplitude A) from the detected value or the command value of the electric angular velocity ω$_e$, based on a correlation between the electric angular velocity ω$_e$ and the amplitude A, making the power supply harmonic less than or equal to the harmonic restriction value, for example. The correlation making the power supply harmonic less than or equal to the harmonic restriction value is a relational rule determined in advance by a test or the like, for example, and is defined by a look-up table, an arithmetic expression, or the like. Similarly, such a correlation can be used to obtain the optimum amplitude A, even in a case where the electric angular velocity ω$_e$ is substituted by the output torque T$_e$ or the input power P$_{in0}$.

The sin(6θ$_e$+B) generated by the waveform generator 25 and the amplitude A derived by the amplitude computing unit 26 are multiplied by the multiplier 27, to thereby obtain the compensation amount C (=A sin(6θ$_e$+B)). The voltage phase reference value δ generated by the motor controller 11 and the compensation amount C generated by the multiplier 27 are added by the adder 13, to thereby generate a voltage phase δ'.

The PWM computing unit 12 generates a three-phase voltage command value of the u-phase, v-phase, and w-phase from the voltage control factor K$_s$ and the voltage phase δ', using polar coordinate transformation, inverse park transformation, spatial vector transformation, or the like. The three-phase voltage command value is a PWM (Pulse Width Modulation) signal. The PWM computing unit 12 can control the magnitude of the alternating current voltage output from the inverter circuit 4, by adjusting the amplitude of the three-phase voltage command value according to the voltage control factor K$_s$. The PWM computing unit 12 converts the three-phase voltage command value into the gate signal G, and outputs the gate signal G to the inverter circuit 4.

As described above, the controller 5A detects the harmonic component caused by the distortion generated in the input power of the motor 7, and varies the phase of the alternating current voltage output from the inverter circuit 4, at the same frequency as the harmonic component, according to the amplitude a of the detected harmonic component, so as to reduce the harmonic component. Accordingly, it is possible to secure the operating range of the motor 7 without decreasing the voltage control factor $K_s$, and at the same time, reduce the power supply harmonic to the power supply harmonic restriction value or less because the harmonic component of the input power of the motor 7 is reduced.

Figure 13:
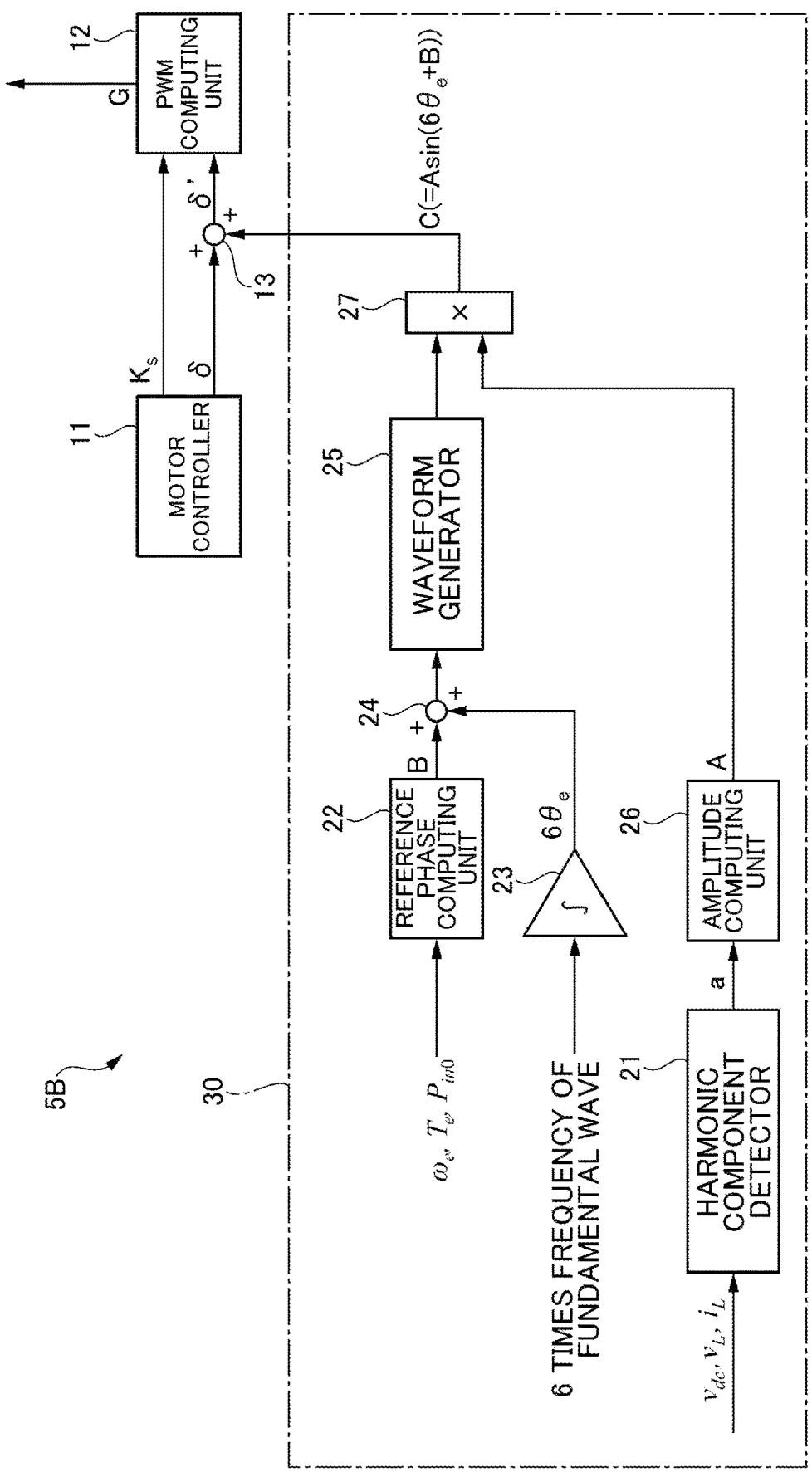
FIG. 13 is a diagram illustrating a second configuration example of the controller.

FIG. 13 is a block diagram illustrating a second configuration example of the controller. A description of the configuration similar to that of the first configuration example will be omitted, by reference to the above description. A controller 5B illustrated in FIG. 13 is an example of the controller 5. The controller 5B includes a compensation unit 30.

In this example, the compensation unit 30 adjusts the amplitude A of the compensation amount C according to the detected amplitude a of the harmonic component, and varies the reference phase B of the compensation amount C according to one of the speed (electric angular velocity $\omega_e$) of the motor 7, the output torque $T_e$ of the motor 7, and the input power $P_{in0}$ of the motor 7. The compensation unit 30 includes the harmonic component detector 21, the reference phase computing unit 22, the integrator 23, the adder 24, the waveform generator 25, the amplitude computing unit 26, and the multiplier 27.

The reference phase computing unit 22 varies the reference phase B of the compensation amount C according to one of the speed (electric angular velocity $\omega_e$) of the motor 7, the output torque $T_e$ of the motor 7, and the input power $P_{in0}$ of the motor 7. The reference phase computing unit 22 generates the optimum reference phase B (an example of the target value of the reference phase B) from the detected value or the command value of the electric angular velocity $\omega_e$, based on the correlation between the electric angular velocity we and the amplitude A, making the power supply harmonic less than or equal to the harmonic restriction value, for example. The correlation making the power supply harmonic less than or equal to the harmonic restriction value is a relational rule determined in advance by a test or the like, for example, and is defined by a look-up table, an arithmetic expression, or the like. Similarly, such a correlation can be used to obtain the optimum reference phase B, even in a case where the electric angular velocity $\omega_e$ is substituted by the output torque $T_e$ or the input power $P_{in0}$.

The amplitude computing unit 26 adjusts the amplitude A of the compensation amount C according to the amplitude a of the harmonic component detected by the harmonic component detector 21. The amplitude computing unit 26 adjusts the amplitude A of the compensation amount C using the hill climbing method, so that the detected amplitude a becomes smaller according to the amplitude a detected by the harmonic component detector 21. Hence, it is possible to obtain an optimum amplitude A (an example of the target value of the amplitude A) for reducing the amplitude of the harmonic component generated in the input power of the motor 7.

The $\sin(6\theta_e+B)$ generated by the waveform generator 25 and the amplitude A derived by the amplitude computing unit 26 are multiplied by the multiplier 27, to thereby obtain the compensation amount C (=A $\sin(6\theta_e+B)$). The voltage phase reference value δ generated by the motor controller 11 and the compensation amount C generated by the multiplier 27 are added by the adder 13, to thereby generate the voltage phase δ'.

As described above, the controller 5B detects the harmonic component caused by the distortion generated in the input power of the motor 7, and varies the phase of the alternating current voltage output from the inverter circuit 4, at the same frequency as the harmonic component, according to the amplitude a of the detected harmonic component, so as to reduce the harmonic component. Accordingly, it is possible to secure the operating range of the motor 7 without decreasing the voltage control factor $K_s$, and at the same time, reduce the power supply harmonic to the power supply harmonic restriction value or less because the harmonic component of the input power of the motor 7 is reduced.

Figure 14:
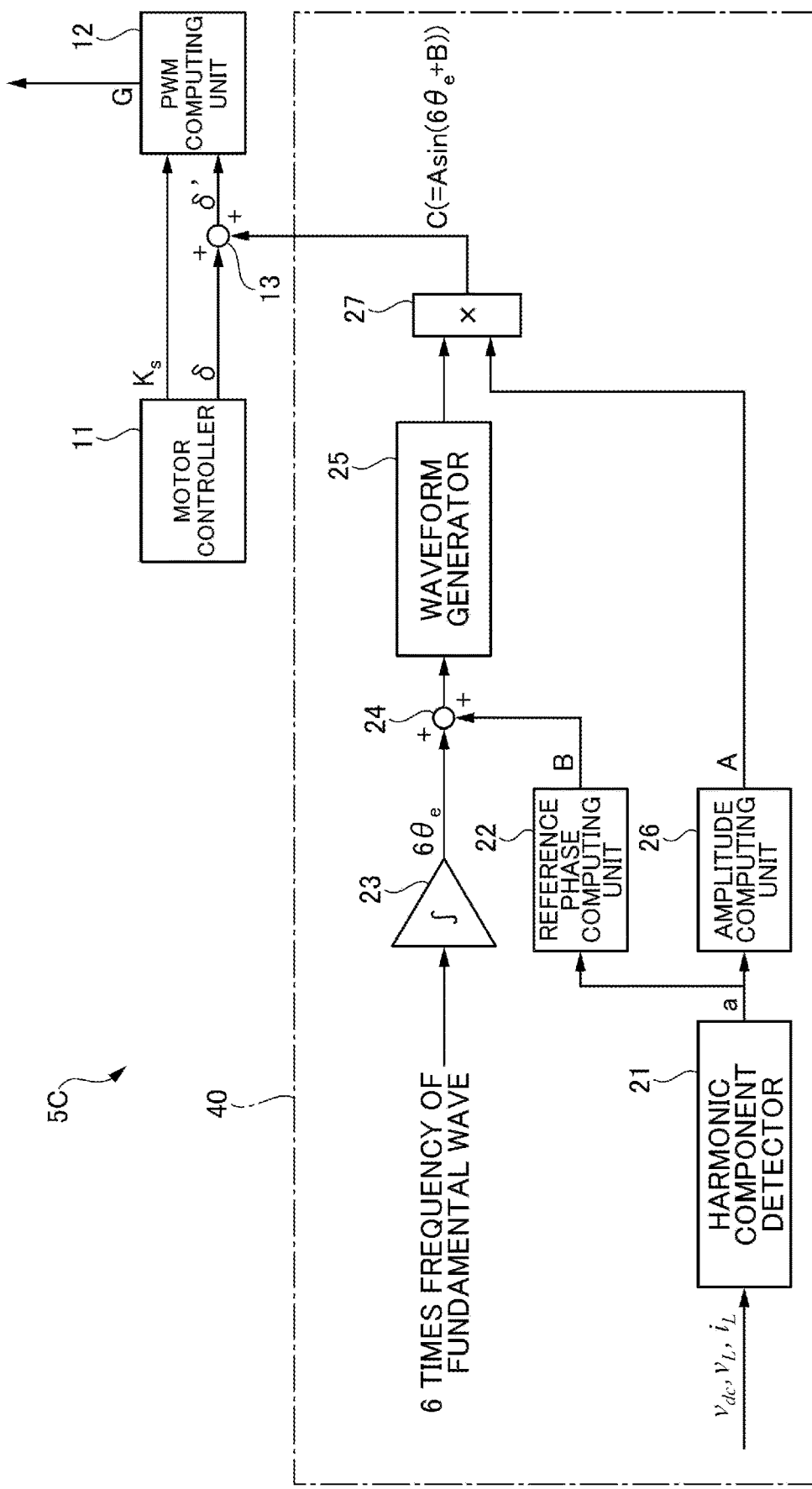
FIG. 14 is a diagram illustrating a third configuration example of the controller.

FIG. 14 is a block diagram illustrating a third configuration example of a controller. A description of the configuration similar to that of the second configuration example will be omitted, by reference to the above description. A controller 5C illustrated in FIG. 14 is an example of the controller 5. The controller 5C includes a compensation unit 40.

In this example, the compensation unit 40 adjusts the amplitude A and the reference phase B of the compensation amount C, according to the detected amplitude a of the harmonic component. The compensation unit 30 includes the harmonic component detector 21, the reference phase computing unit 22, the integrator 23, the adder 24, the waveform generator 25, the amplitude computing unit 26, and the multiplier 27. The reference phase computing unit 22 has the same functions as the first configuration example (FIG. 12), and the amplitude computing unit 26 has the same functions as the second configuration example (FIG. 13).

The controller 5C detects the harmonic component caused by the distortion generated in the input power of the motor 7, and varies the phase of the alternating current voltage output from the inverter circuit 4, at the same frequency as the harmonic component, according to the amplitude a of the detected harmonic component, so as to reduce the harmonic component. Accordingly, it is possible to secure the operating range of the motor 7 without decreasing the voltage control factor $K_s$, and at the same time, reduce the power supply harmonic to the power supply harmonic restriction value or less because the harmonic component of the input power of the motor 7 is reduced.

Figure 8:
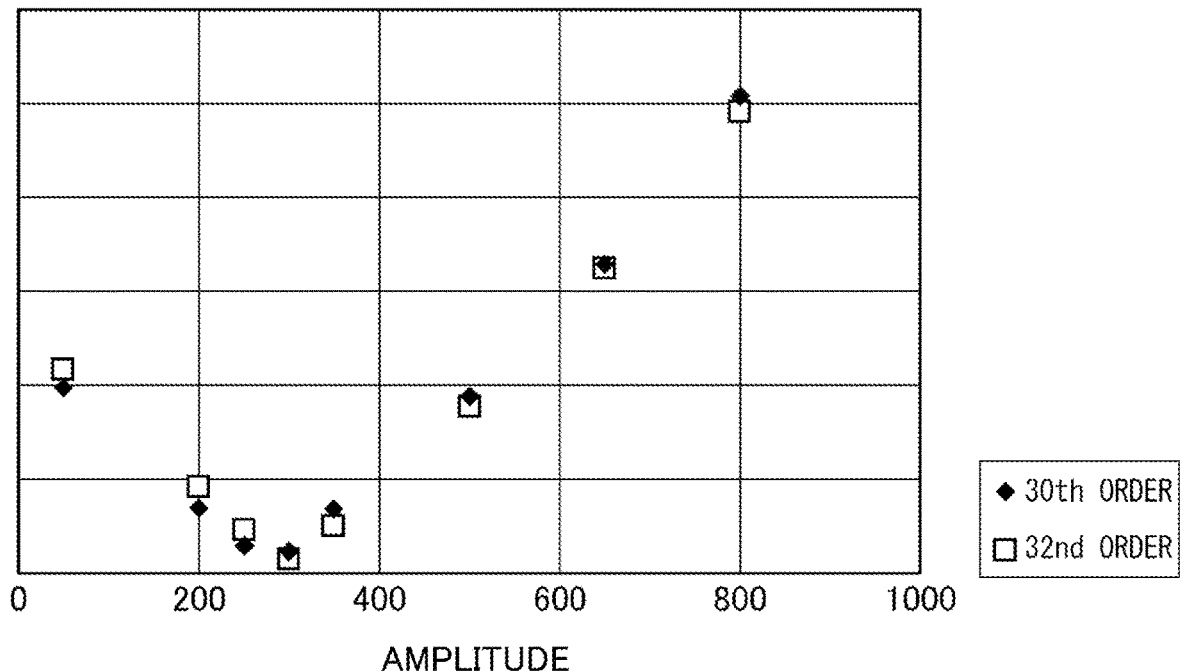
FIG. 8 is a diagram illustrating an example of test results when the motor is driven in an actual machine by the technique of the present disclosure.
Figure 9:
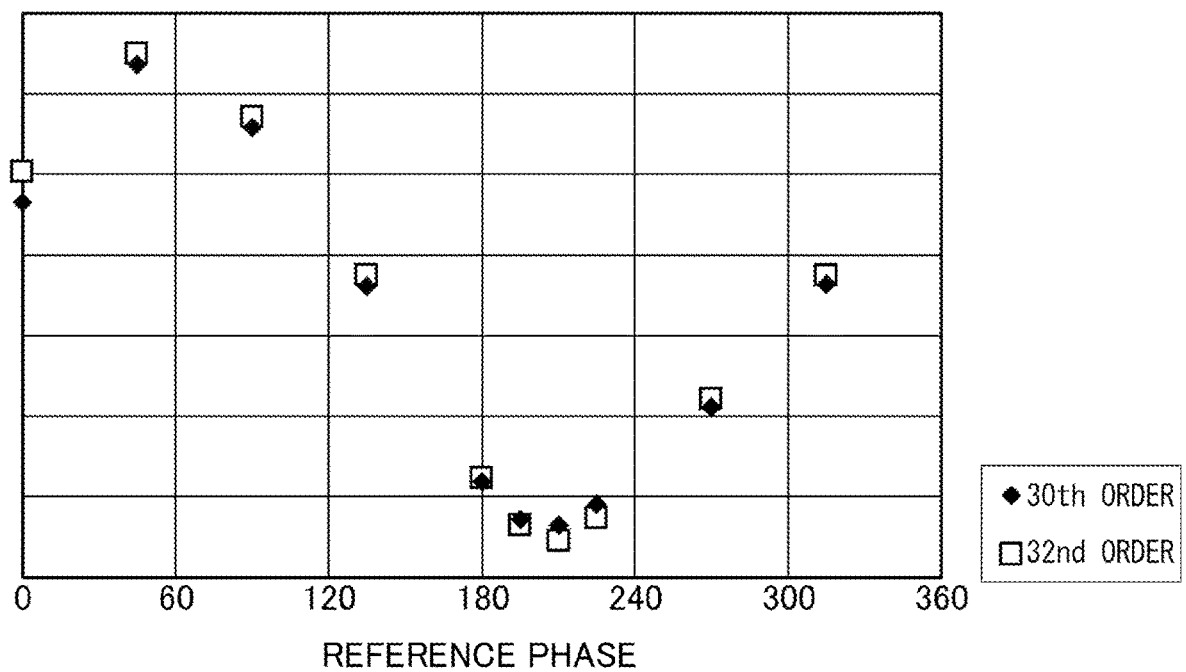
FIG. 9 is a diagram illustrating the example of the test results when the motor is driven in the actual machine by the technique of the present disclosure.

FIG. 8 and FIG. 9 are diagrams illustrating examples of test results when the motor is driven in an actual machine by the technique of the present disclosure. FIG. 10 and FIG. 12 illustrate cases where the motor is actually driven by the power conversion apparatuses having the configurations illustrated in FIG. 10 and FIG. 12. The ordinate indicates the power supply harmonic generated on the side of the alternating current power supply 6 due to a power $P_{in6}$ of the sixth order harmonic component of the input power of the motor 7. By varying the amplitude A or the reference phase B, the power supply harmonic varies. Because there is an amplitude A and a reference phase B at which each of the thirtieth order and thirty-second order power supply harmonics is approximately zero, the amplitudes of each of the thirtieth order and thirty-second order power supply harmonics can satisfy the power supply harmonic restriction value.

While the embodiments have been described, it will be understood that various modifications of embodiments and details may be made without departing from the spirit and scope of the claims. Various variations and modifications, such as combinations, substitutions, or the like of a part or all of the other embodiments are possible.

This international application is based upon and claims priority to Japanese Patent Application No. 2019-192870, filed Oct. 23, 2019, and the entire contents of Japanese Patent Application No. 2019-192870 are incorporated herein by reference.

DESCRIPTION OF THE REFERENCE NUMERALS 1A, 1B Power conversion apparatus
4 Inverter circuit
5, 5A, 5B, 5C Controller
6 Alternating current power supply
7 Motor
8 Reactor
20, 30, 40 Compensation unit

The invention claimed is:

1. A power conversion apparatus that converts an input alternating current power supplied from an alternating current power supply into an output alternating current power having a predetermined voltage and frequency, comprising:
an inverter circuit configured to supply the output alternating current power to a motor; and
a compensation unit configured to compensate for a harmonic of an input power of the motor,
wherein the compensation unit detects a harmonic component generated in synchronism with a speed of the motor in the input power, and varies a phase of an alternating current voltage output from the inverter circuit at the same frequency as the harmonic component, so as to reduce the harmonic component.

2. The power conversion apparatus as claimed in claim 1, wherein the compensation unit generates a compensation amount that varies at the same frequency as the harmonic component, and varies the phase of the alternating current voltage at the same frequency as the harmonic component based on the compensation amount.

3. The power conversion apparatus as claimed in claim 2, wherein the compensation unit adjusts a phase of the compensation amount according to the detected harmonic component, and varies an amplitude of the compensation amount according to one of the speed, a torque, and a power of the motor.

4. The power conversion apparatus as claimed in claim 2, wherein the compensation unit adjusts an amplitude of the compensation amount according to the detected harmonic component, and varies a phase of the compensation amount according to one of the speed, a torque, and a power of the motor.

5. The power conversion apparatus as claimed in claim 2, wherein the compensation unit adjusts a phase and an amplitude of the compensation amount according to the detected harmonic component.

6. The power conversion apparatus as claimed in claim 1, further comprising:
a converter circuit configured to rectify the input alternating current power, and supply power to the inverter circuit, wherein
a capacitor is coupled between the converter circuit and the inverter circuit, in parallel to the converter circuit, and
the compensation unit detects the harmonic component from a voltage across both ends of the capacitor.

7. The power conversion apparatus as claimed in claim 1, further comprising:
a converter circuit configured to rectify the input alternating current power, and supply power to the inverter circuit, wherein
a reactor is coupled between the converter circuit and the alternating current power supply or the inverter circuit, and
the compensation unit detects the harmonic component from a voltage across both ends of the reactor.

8. The power conversion apparatus as claimed in claim 1, further comprising:
a converter circuit configured to rectify the input alternating current power, and supply power to the inverter circuit, wherein
a reactor is coupled between the converter circuit and the alternating current power supply or the inverter circuit, and
the compensation unit detects the harmonic component from a current flowing through the reactor.

9. The power conversion apparatus as claimed in claim 1, wherein the compensation unit acquires a signal for detecting the harmonic component, during a period in which a voltage vector of the inverter circuit does not vary.

10. The power conversion apparatus as claimed in claim 2, further comprising:
a converter circuit configured to rectify the input alternating current power, and supply power to the inverter circuit, wherein
a capacitor is coupled between the converter circuit and the inverter circuit, in parallel to the converter circuit, and
the compensation unit detects the harmonic component from a voltage across both ends of the capacitor.

11. The power conversion apparatus as claimed in claim 2, further comprising:
a converter circuit configured to rectify the input alternating current power, and supply power to the inverter circuit, wherein
a reactor is coupled between the converter circuit and the alternating current power supply or the inverter circuit, and
the compensation unit detects the harmonic component from a voltage across both ends of the reactor.

12. The power conversion apparatus as claimed in claim 2, further comprising:
a converter circuit configured to rectify the input alternating current power, and supply power to the inverter circuit, wherein
a reactor is coupled between the converter circuit and the alternating current power supply or the inverter circuit, and
the compensation unit detects the harmonic component from a current flowing through the reactor.

13. The power conversion apparatus as claimed in claim 2, wherein the compensation unit acquires a signal for detecting the harmonic component, during a period in which a voltage vector of the inverter circuit does not vary.

* * * * *